United States Patent [19]

Ziebell et al.

[11] 4,031,468
[45] June 21, 1977

[54] RECEIVER MOUNT

[75] Inventors: Donald O. Ziebell; James M. Longly, both of Lexington, Nebr.

[73] Assignee: Reach Electronics, Inc., Lexington, Nebr.

[22] Filed: May 4, 1976

[21] Appl. No.: 682,843

[52] U.S. Cl. .............................. 325/312; 325/353; 325/354; 325/361; 343/702
[51] Int. Cl.² ........................................ H04B 1/08
[58] Field of Search .......... 325/111, 119, 312, 313, 325/352–354, 361; 343/702; 317/101 CB; 312/7 R

[56] References Cited
UNITED STATES PATENTS

| 2,702,604 | 2/1955 | Hocks et al. | 325/361 |
| 3,230,533 | 1/1966 | Brill | 325/354 |
| 3,244,981 | 4/1966 | Tatevasian | 325/312 |

FOREIGN PATENTS OR APPLICATIONS 844,968  8/1960  United Kingdom ............... 325/312

*Primary Examiner*—Robert L. Richardson
*Assistant Examiner*—Marc E. Bookbinder
*Attorney, Agent, or Firm*—Vogel, Dithmar, Stotland, Stratman & Levy

[57] ABSTRACT

The mount includes a holder for the receiver, a terminal on the holder for connection to an antenna, and a conductor on the holder which is adapted to be contacted by the clip of the receiver when it is positioned in the holder.

13 Claims, 10 Drawing Figures

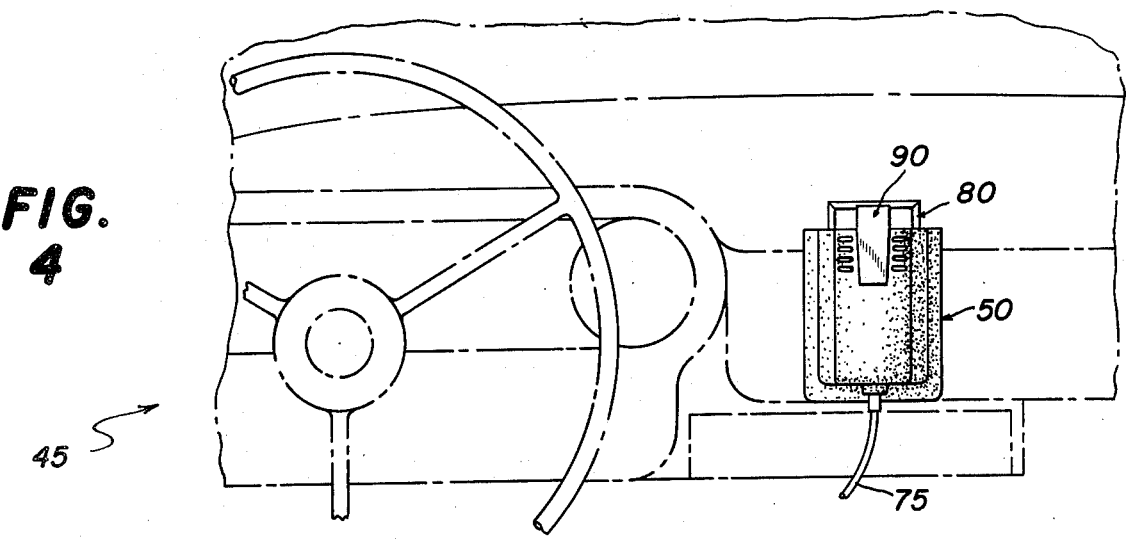
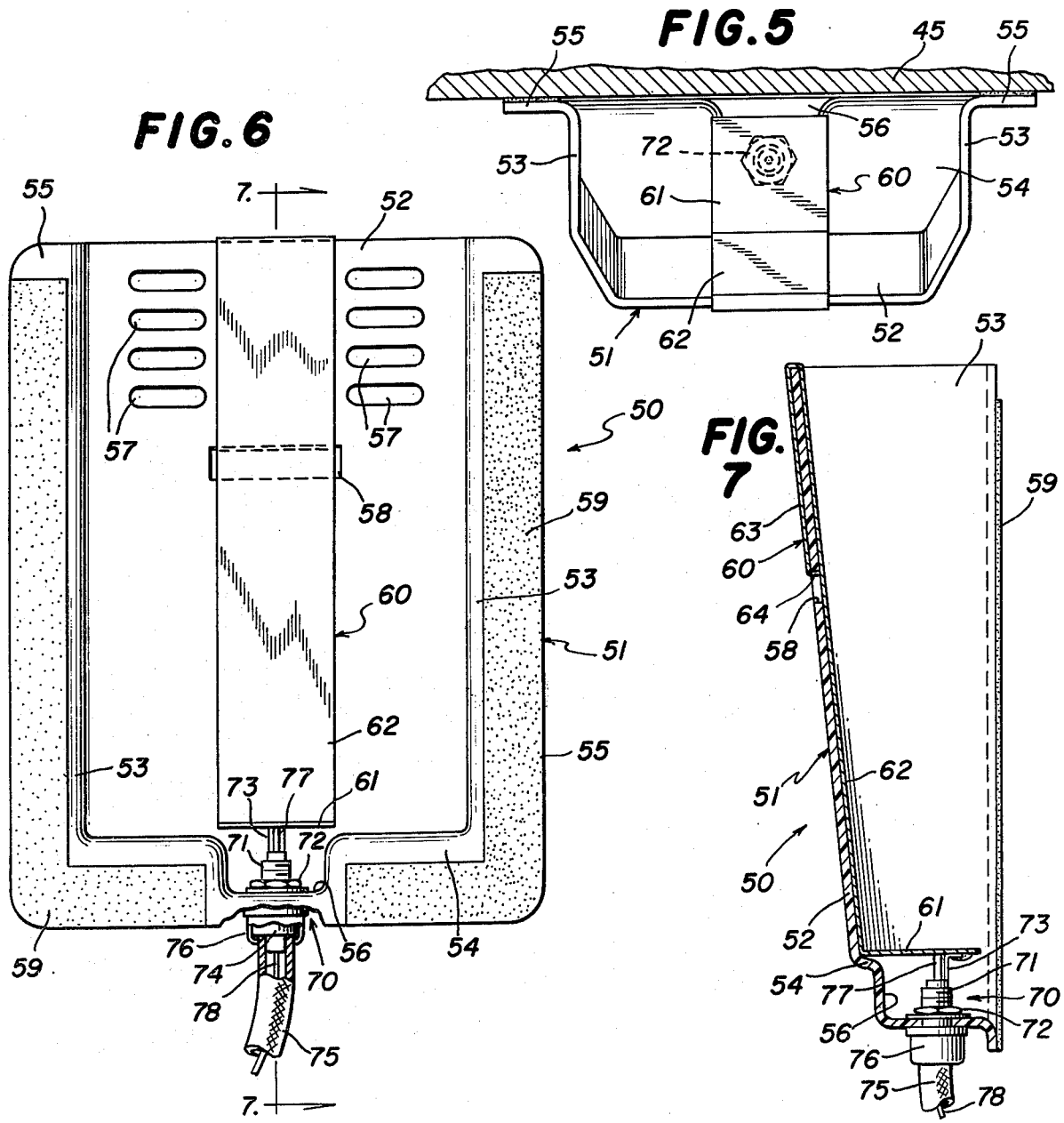

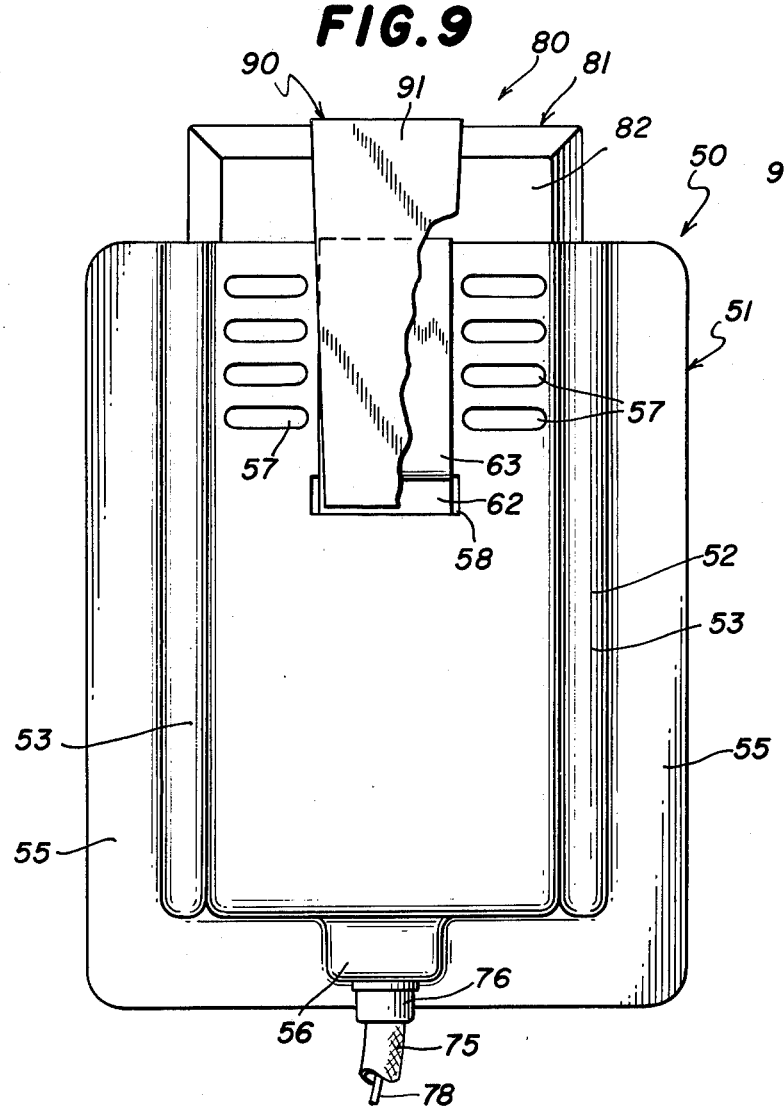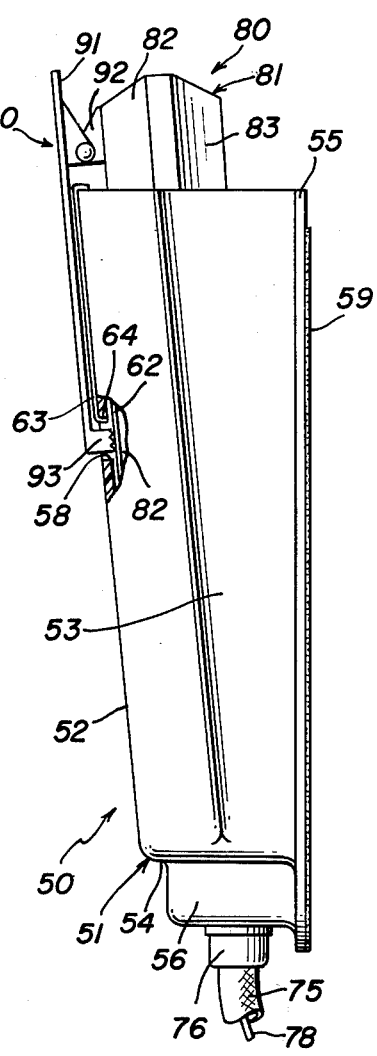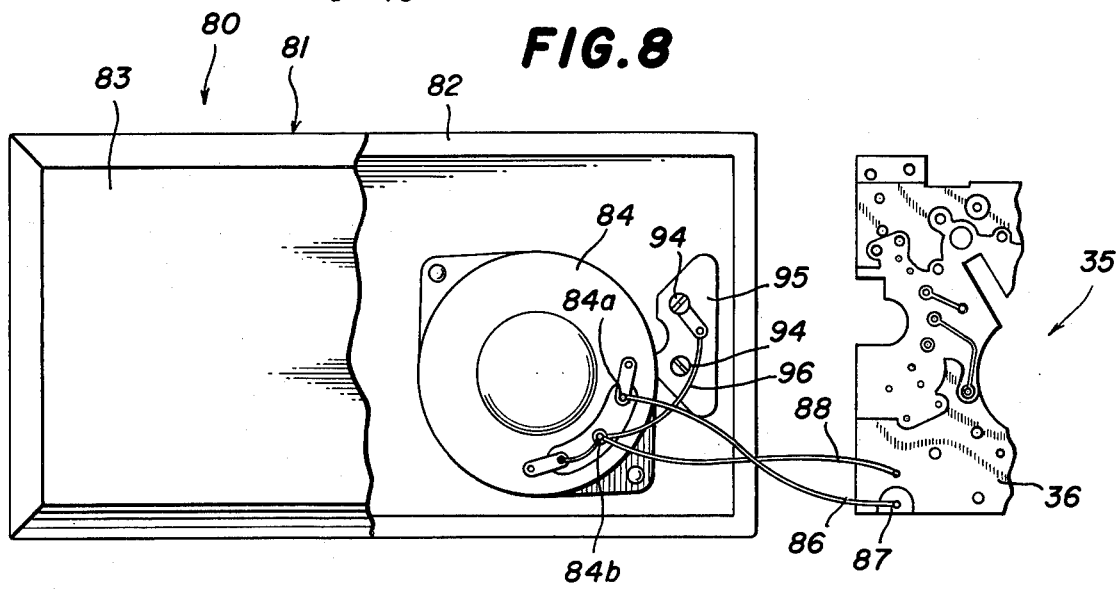

RECEIVER MOUNT

BACKGROUND OF THE INVENTION

Portable radio frequency (RF) receivers are usually worn on one's belt or in one's shirt pocket. Such receivers are commonly called pagers and either emit an alerting tone, thereby informing the wearer to perform some prearranged act, or reproduce a voice message. When the possessor of such a receiver is in a vehicle, the sensitivity of the receiver deteriorates substantially primarily because of all the metal surrounding the receiver. Also, the receiver is difficult to hear and perhaps uncomfortable when worn on one's person when sitting in the vehicle.

SUMMARY OF THE INVENTION

It is therefore an important object of the present invention to improve the sensitivity of a portable RF receiver when it is used in a vehicle.

Another object is to provide a dashboard mount for the receiver so that the possessor need not wear it when he is in the vehicle.

In summary, there is provided a mount for a portable RF receiver having a clip constituting the input for RF signals and being adapted to be connected to an antenna, the mount comprising a holder for a receiver, a terminal on the holder for connection to an antenna, and means on the holder electrically coupled to the terminal and being constructed and arranged to be contacted by the clip of a receiver positioned in the holder. In one form of the invention, the holder is an integral piece of plastic having a front wall, side walls, a bottom wall and a flange at the rear ends of these walls for attachment to for example, a vehicular dashboard.

The invention consists of certain novel features and a combination of elements hereinafter fully described, illustrated in the attached drawings and claimed in the appended claims, it being understood that various changes in the details may be made without departing from the spirit or sacrificing any of the advantages of the invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages can be readily understood and appreciated.

FIG. 4 is an elevational view of a dashboard shown in phantom, to which is attached a mount incorporating the features of the present invention, which mount contains a portable RF receiver;

FIG. 5 is a top plan view, on an enlarged scale, of the receiver mount of FIG. 4;

FIG. 6 is a rear elevational view, on the same enlarged scale, of the mount depicted in FIG. 4;

FIG. 7 is a view in vertical section taken from along the line 7—7 of FIG. 6;

FIG. 8 is a rear view of the receiver with a portion of the back cover cut away to expose the speaker and certain connections thereto, a fragmentary portion of the receiver printed circuit board being shown toward the right;

FIG. 9 is a front elevational view of the mount and the receiver disposed therein; and FIG. 10 is an end elevational view of the receiver and mount of FIG. 8.

DETAILED DESCRIPTION OF THE PREFERRED EMBODIMENT

Figure 1:
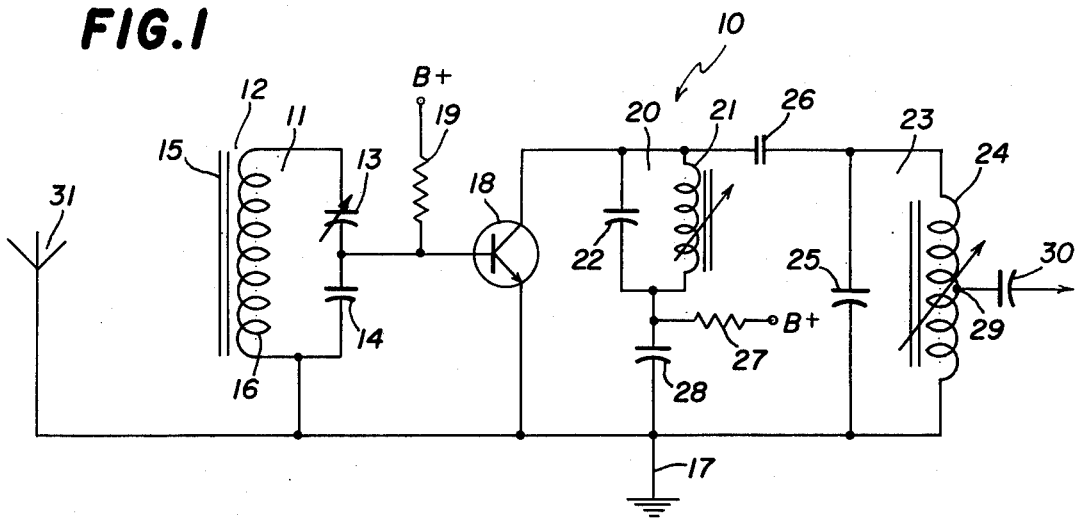
FIG. 1 is a schematic diagram depicting an external antenna and a RF amplifier forming part of the RF receiver carried by a mount incorporating the features of the present invention.

Turning now to FIG. 1, there is depicted an RF amplifier 10 of the kind found in a superheterodyne receiver, for example, which includes an input resonant circuit 11 having an inductor 12 and a pair of serially connected capacitors 13 and 14 thereacross. The indicator 12 includes a ferrite core 15 and a winding 16. One end of the winding 16 and one terminal of the capacitor 14 are connected together and to a point of ground reference potential 17. The capacitor 13 is variable and is adjusted so that the resonant circuit 11 is resonant at the frequency of the RF signal which the receiver is intended to receive. Such tuning may be performed by applying to the receiver an RF signal at such frequency, and then adjusting the capacitor 13 for a maximum response.

The junction of the capacitors 13 and 14 is coupled to the base of a NPN transistor 18. Bias for the transistor 18 is obtained by a resistor 19 coupled from the supply voltage to its base. The collector of the transistor 18 is coupled to an output resonant circuit having a slug-tuned inductor 21 and a capacitor 22. The resonant circuit 20 is tuned by adjusting the position of the slug in the inductor 21, to maximize the response to the desired RF frequency. A second resonant circuit 23 includes a slug-tuned inductor 24 and a capacitor 25 connected in parallel therewith. The resonant circuit 23 is coupled to the resonant circuit 20 by means of a capacitor 26. The resonant circuit 23 is tuned in the same way as the circuit 20. A DC supply voltage is coupled to the collector of the transistor 18 by means of a resistor 27, a capacitor 28 being provided for decoupling purposes. The inductor 24 has a tap 29 from which the RF output is taken and passed through a capacitor 30 to the next stage.

The inductor 12 actually is an antenna of the "loopstick" variety. However, such antenna usually does not have sufficient gain, and it is therefore desirable to use an external antenna in addition, particularly when used in an automobile. The center lead of a coaxial cable connects a selected tap on the winding 16 to the signal terminal of the antenna, and the shielding of such cable is connected to the ground terminal of the antenna and to ground reference potential of the receiver. It is important that the tap be selected accurately so that the antenna impedance, which usually is 50 ohms, is properly matched to the RF amplifier impedance. However, in practice this is difficult to attain, and what normally occurs is that the connection of the antenna 31 detunes one or more of the resonant circuits 11, 20 and 23 with a corresponding degradation in receiver performance.

To overcome this, the signal terminal of the antenna 31 is connected directly to ground reference potential 17, as shown in FIG. 1. Such point of ground reference potential is in common with the ground reference potential of the rest of the receiver which incorporates the RF amplifier 10. In a vehicle, the shielding on the coaxial cable is directly connected to the vehicle chassis, in which case the ground reference potential on the receiver is floating. In a portable receiver, the shielding is not used.

Figure 2:
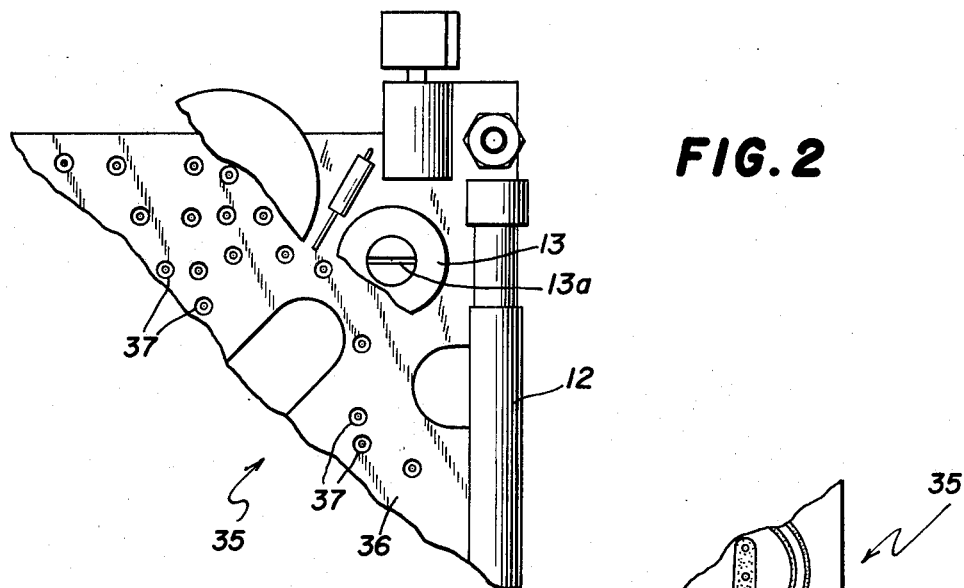
FIG. 2 is a fragmentary corner view of a printed circuit board on which the components of FIG. 1 are mounted, with some of the components being cut away.

Turning now to FIG. 2, there is depicted a corner of a printed circuit board assembly 35, on which is mounted the components of the receiver, including the components of the RF amplifier 10. Two of the components appear in FIG. 2, namely, the inductor 12 and the capacitor 13. A slot 13a is adapted to receive a screwdriver tip in order to enable adjustment of the capacitance furnished by the capacitor 13.

The assembly 35 includes an insulation board 38 (e.g., phenolic resin), one side of which is substantially covered by plating 36. A number of small, nonplated areas 37 surround the holes through which leads of the components pass. The plating 36 defines a ground reference plane to which the point of ground reference potential 17 is connected, along with the other points of ground reference potential throughout the receiver.

Figure 3:
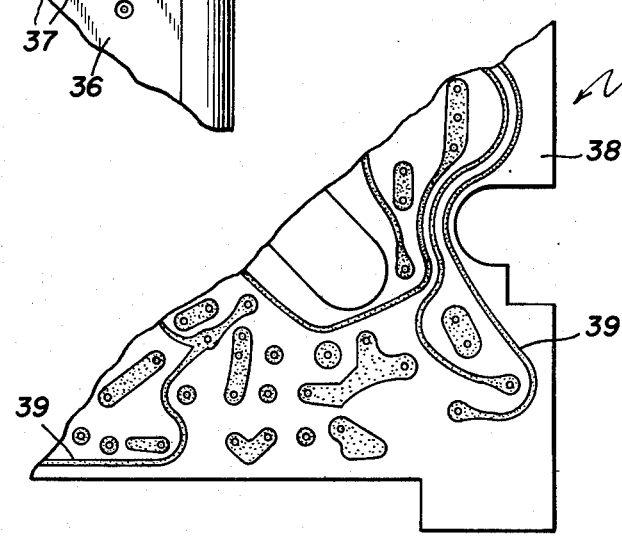
FIG. 3 is a view of the underside of the corner of the printed circuit board corner of FIG. 2.

FIG. 3 depicts the underside of the printed circuit board assembly 35, there being shown on the board 38 strips 39 of plating connecting the various components in the usual way.

The RF amplifier 10 is tuned in the manner described above. When the antenna 31 is thereafter connected to ground reference potential 17, it has virtually no effect on the tuning. There is no need to retune the receiver, with the attendant unlikelihood of achieving the optimum response that is expected.

When the receiver includes plating 36 constituting a ground plane, connection of the antenna 31 to ground reference potential yields a substantial improvement in performance over that when the antenna is connected to a tap on the winding 16. If the receiver has no ground plane, even connection of the antenna 31 to ground reference potential results in a noticeable improvement in performance over that when the antenna 31 is connected to a tap on the winding 16, but not as great as when a ground reference plane is provided.

The foregoing has been described and claimed in an application Ser. No. 603,350, for RF AMPLIFIER AND ANTENNA, which is assigned to the same assignee as is the present application.

The receiver which incorporates the RF amplifier 10 is portable and is adapted to be worn on an article of clothing such as one's belt or in one's shirt pocket. In a vehicle, it is desirable to remove the receiver and connect it to an external antenna 31. FIG. 4 illustrates in phantom a vehicle dashboard 45 on which there is attached a mount 50 for a receiver 80.

Turning to FIGS. 5-7, the mount 50 includes a holder 51 having a front wall 52, side walls 53 and a bottom wall 54. A flange 55 is carried by the walls 53 and 54 at the rear ends thereof. Preferably, the holder 51 is an integral piece of plastic molded to form the elements just mentioned. Formed in the bottom wall 54 is a well 56.

The planes of the flange 55 and the front wall 52 converge downwardly so that the thickness of the holder 51 is greater at the top than at the bottom. When the holder 51 is attached to the vehicle dashboard 45 it thereby defines a receptacle for the receiver 80 as will be described. The opening at the top being larger facilitates insertion of the receiver 80. The planes of the front portions of the side walls 53 converge forwardly (see FIG. 5) so as to conform to the shape of the receiver 80.

A set of slots 57 in the front wall 52 are arranged to be aligned with the speaker openings in the receiver housing. Thus the sounds emitted by the receiver 80 readily pass through the holder 51.

Also formed in the front wall 52 is a laterally directed slot 58 which is centered laterally. It receives the gripper of the receiver clip in a manner to be described hereinafter. In this form of the invention, a self-stick adhesive 59 is provided on the rear of the flange 55. A release liner (not shown) associated with the self-stick adhesive 59 can be removed, so that the holder 51 can be pressed against and retained by the dashboard 45. Instead of a continuous adhesive 59, discrete areas of adhesive may be provided; also, other types of fastening, such as screws or the like, may be employed.

The mount 50 further includes a metal strip 60 having a first portion 61 opposed adjacent to the bottom wall 54, and above the well 56. A second portion 62 is disposed adjacent to the rear surface of the front wall 52. The strip 60 is bent over the top of the holder 51, and has a third portion 63 positioned against the front surface of the front wall 52. A fourth portion 64 is formed at the end of the strip 60 and is disposed within the slot 58.

The mount 50 also includes a female jack 70 constituting an antenna terminal. The jack 70 has a threaded shank 71 and a nut 72 to attach the jack 70 in the well 56. The jack 70 includes a lug 73 soldered to the portion 61 of the metal strip 60 (see FIG. 7). The jack 70 has a stud 74 which is usually grounded and which has a bore extending therethrough.

There is provided an antenna cable 75 having a male terminal represented by a collar portion 76 and a pin 77. The pin 77 is electrically connected to the "hot" lead 78, while the collar 76 is connected to the shielding (not shown) in the cable 75. When the pin 77 is inserted through the stud 74 so as to make electrical contact with the lug 73 while the collar 76 is in frictional and electrical contact with the stud 74. However the stud 74 is simply left "floating". Thus there is electrical continuity between the hot lead 78 and the portion 63 of the strip 60, the significance of which will be described presently.

Referring to FIG. 8, the receiver 80 has a housing 81 defined by a front section 82 and a rear section 83. Attached to the front section 82 is a speaker 84, the input of which appears across terminals 84a and 84b. The terminal 84a is connected by way of a wire 86 to a terminal 87 on the printed circuit board 35, which is in turn connected to the audio amplifier elements (not shown) mounted on such printed circuit board. The terminal 84b constitutes a ground connection and it is connected by way of a wire 88 to the plating 36 on the printed circuit board 35.

Referring to FIGS. 9 and 10, the receiver 80 also includes a clip 90 having a plate-like arm 91 pivotally mounted to the front housing section 82 by means of a pillow block 92. Depending from the free end of the arm 91 is a gripper 93 that normally engages the front surface of the front section 82, by virtue of spring bias applied to the arm 91. The pillow block 92 is retained by screws 94 (FIG. 8) passing therethrough and through a metal plate 95. One of the screws 94 is connected by way of a wire 96 to the ground terminal 84b on the speaker 84. The arm 91, the pillow block 92, the screws 94 and the plate 95 are all electrically conductive, whereby the arm 91 is electrically connected to the plating 36, and thus is at ground reference potential.

To place the receiver 80 in the mount 50, the upper end of the arm 91 is depressed to move the gripper 93 away from the housing 81. The receiver 80 is then lowered into the receptacle defined by the dashboard 45 and the mount 50. When the arm 91 is released, the previously mentioned spring bias causes the gripper 93 to return to its rest position and accordingly to enter the slot 58 as shown in FIGS. 9 and 10. In such position, the arm 91 contacts the portion 63 of the strip 60, causing an electrical connection between the hot lead 78 in the cable 75 and the plating 36 (FIG. 8). Thus the point of ground reference potential (17 in FIG. 1) is effectively connected to the antenna 31 simply by depositing the receiver 80 in its mount 50.

The gripper 93 being disposed within the slot 58 and against the housing 81 minimizes undesirable shifting while the vehicle is moving. Because the receiver 80 is disposed forwardly of the driver while in its mount 50, he is better able to hear a page, than would be the case if he kept it on his person while driving.

It is believed that the invention, its mode of construction and assembly, and many of its advantages should be readily understood from the foregoing, without further description, and it should also be manifest that, while a preferred embodiment of the invention has been shown and described for illustrative purposes, the structural details are, nevertheless, capable of wide variation within the purview of the invention as defined by the appended claims.

We claim:

1. A mount for a portable RF receiver, said receiver having a current conducting clip constituting the receiver input for RF signals, said clip adapted to be connected to an antenna, said mount comprising a holder for said receiver, a terminal on said holder for connection to an antenna, and means on said holder electrically coupled to said terminal and placed into electrical contact with said clip when said receiver is positioned in said holder.

2. The mount of claim 1, wherein said clip is constructed and arranged to grip said holder.

3. The combination comprising a portable RF receiver including an RF amplifier for amplifying RF signals, said RF amplifier having an R.F. signal input point of ground reference potential, and a current-conducting clip electrically coupled to said point of ground reference potential; and a receiver mount including a holder for said receiver, a terminal on said holder for connection to an antenna, and means on said holder electrically coupled to said terminal and placed into electrical contact with said clip when said receiver is position in said holder.

4. A mount for a portable RF receiver having a current conducting clip constituting the input for RF signals, said clip adapted to be connected to an antenna, said mount comprising a holder for said receiver, said holder having a front wall, a pair of side walls and a bottom wall extending rearwardly from said front wall, a terminal on said holder for connection to an antenna, and means on said holder electrically coupled to said terminal and placed into electrical contact with said clip when said receiver is positioned in said holder.

5. The mount of claim 4, wherein said holder further has a substantially planar flange on the rear ends of said side walls and said bottom wall, said flange being attachable to the dashboard of a vehicle.

6. The mount of claim 4, wherein said terminal is a jack depending from said bottom wall for attachment to an antenna cable.

7. The mount of claim 4, wherein said means is a metal plate disposed on the front surface of said front wall.

8. The mount of claim 4, and further comprising a metal strip having a first portion disposed near said bottom wall, a second portion disposed against the rear surface of said front wall, and a third portion disposed against the front surface of said front wall, said third portion constituting the means to be electrically contacted by the clip of said receiver, said terminal including a jack depending from said bottom wall and means electrically connecting said jacks to said first portion.

9. The mount of claim 4, wherein said front, side and bottom walls are integrally molded of plastic.

10. The combination comprising a portable RF receiver including a housing and a current-conducting clip constituting the input for RF signals to said receiver; and a receiver mount including a holder for said receiver, said holder having a front wall, and a pair of side walls and a bottom wall extending rearwardly from said front wall, a terminal on said holder for connection to an antenna, and means on said holder electrically coupled to said terminal and placed into electrical contact with said clip when said receiver is positioned in said holder.

11. The mount of claim 10, wherein said receiver has a speaker and said housing has openings for sounds to be emitted by said speaker, said front wall of said holder having openings aligned with the openings in said housing.

12. The mount of claim 10, wherein said clip includes an arm pivotally mounted at one end to said housing, and a gripper at the other end of said arm movable toward and away from said housing, said front wall having a slot therein for receiving said gripper when said receiver is positioned in said holder.

13. The mount of claim 12, and further comprising a metal strip having a first portion disposed near said bottom wall, a second portion disposed against the rear surface of said front wall, a third portion disposed against the front surface of said front wall, and a fourth portion extending into said slot, said third portion constituting the means to be electrically contacted by said clip.

* * * * *

UNITED STATES PATENT AND TRADEMARK OFFICE
CERTIFICATE OF CORRECTION

PATENT NO. : 4,031,468
DATED : June 21, 1977
INVENTOR(S) : Donald O. Ziebell and James M. Longly It is certified that error appears in the above-identified patent and that said Letters Patent are hereby corrected as shown below:

Column 2, lines 21 & 22, "indicator" should be --inductor--.

Column 6, line 26, "jacks" should be --jack--.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*